(12) United States Patent
McElroy

(10) Patent No.: US 6,450,125 B2
(45) Date of Patent: Sep. 17, 2002

(54) FLOOR OVERLAY AND DRAINAGE CHUTE FOR LIVESTOCK ENCLOSURES

(76) Inventor: Johnny R. McElroy, P.O. Box 302, Snyder, OK (US) 73566

( * ) Notice: Subject to any disclaimer, the term of this patent is extended or adjusted under 35 U.S.C. 154(b) by 0 days.

(21) Appl. No.: 09/800,181

(22) Filed: Mar. 6, 2001

Related U.S. Application Data

(60) Provisional application No. 60/187,131, filed on Mar. 6, 2000.

(51) Int. Cl.$^7$ ................................................. A01K 1/01
(52) U.S. Cl. ...................................... 119/529; 119/527
(58) Field of Search ................................ 119/453, 479, 119/496, 509, 525, 527, 528, 529, 530

(56) References Cited

U.S. PATENT DOCUMENTS

| | | | |
|---|---|---|---|
| 502,221 A | * | 7/1893 | Brown ........................ 119/527 |
| 592,960 A | * | 11/1897 | Brion ........................... 119/528 |
| 3,828,733 A | * | 8/1974 | Correia ........................ 119/527 |
| 4,048,960 A | | 9/1977 | Barnidge et al. |
| 4,235,197 A | | 11/1980 | Curtis et al. |
| 4,498,418 A | | 2/1985 | Chumley |
| 5,351,458 A | | 10/1994 | Lehe |
| 5,438,955 A | | 8/1995 | Herden |
| 5,513,595 A | | 5/1996 | Chatterton |
| 5,596,951 A | * | 1/1997 | Lagadec ...................... 119/525 |
| 5,791,726 A | | 8/1998 | Kaufman |
| 5,862,779 A | | 1/1999 | Kleinsasser |

* cited by examiner

Primary Examiner—Charles T. Jordan
Assistant Examiner—Elizabeth Shaw
(74) Attorney, Agent, or Firm—Crowe & Dunlevy, P.C.

(57) ABSTRACT

The present invention is directed to an enclosure for the containment of livestock. Preferably, the livestock enclosure includes a floor assembly forming a planar floor surface and an overlay assembly operably coupled to the floor assembly for selectable engagement with the floor assembly. Preferably, the overlay assembly includes a traction grid having a plurality of grid apertures extending therethrough, wherein the overlay assembly is configured to be placed adjacent the planar floor surface to provide traction for livestock placed within the enclosure. The overlay assembly is preferably configured to be moved, thereby allowing waste from the livestock to flow through the grid apertures and onto the planar floor surface to facilitate removal of said waste from the planar floor surface to clean the enclosure.

22 Claims, 3 Drawing Sheets

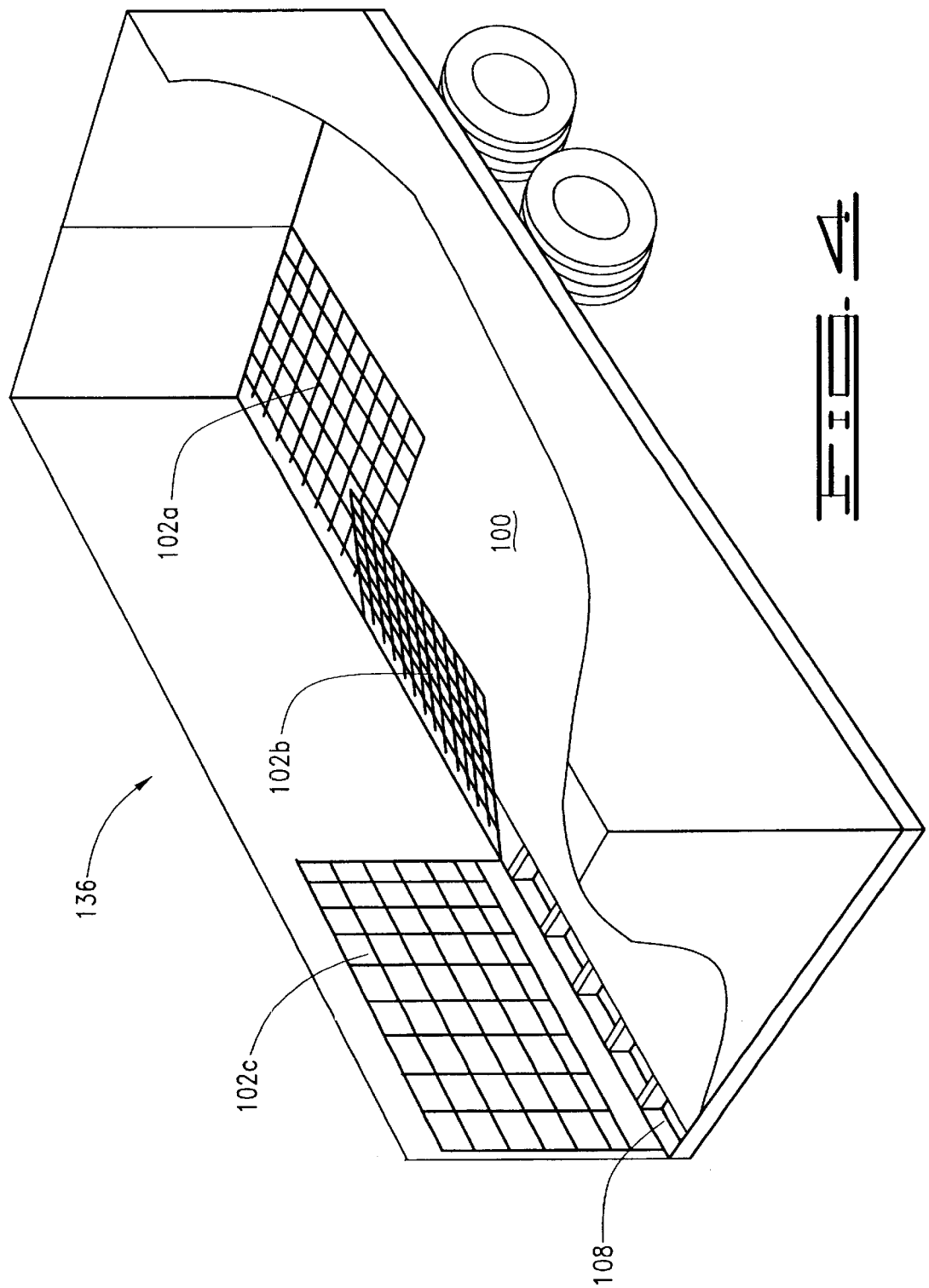

FLOOR OVERLAY AND DRAINAGE CHUTE FOR LIVESTOCK ENCLOSURES

RELATED APPLICATIONS

This application claims priority to U.S. Provisional Application No. 60/187,131 entitled FLOOR OVERLAY AND DRAINAGE GATE FOR ANIMAL ENCLOSURE, filed Mar. 6, 2000.

FIELD OF THE INVENTION

The present invention relates generally to an improved flooring apparatus for use in a livestock enclosure, such as a transport trailer. The invention more particularly relates to a flooring apparatus that provides improved traction and facilitated cleaning.

BACKGROUND OF THE INVENTION

Over the years, livestock enclosures, such as livestock trailers, have been the subject of numerous improvements and innovations. Through this evolution of design, the majority of modem animal and livestock transports follow a common underlying form. A bottom frame is made of steel or aluminum joists which extend partially or completely across the length or width of the transport. The joists are held in position by a number of perimeter beams which define the outline of the transport floor. A floor is then fitted to, and supported by, the bottom frame. Typically, the floor consists of a plurality of rectangular floor members which extend partially or completely along the length of the transport. The floor members have been traditionally constructed from rigid or semi-rigid materials such as extruded aluminum or wood.

During use, animals deposit substantial solid and liquid wastes on the transport floor. These deposits cause the transport floor to become increasingly slippery. Consequently, during transportation, loading and unloading, animals frequently slip or loose their footing. The resulting fall can cause significant injury to the animal. In a larger transport, the severity of the injury may be compounded as surrounding animals inadvertently trample the fallen animal.

There have been numerous prior attempts to provide increased-traction flooring for use in animal enclosures. One solution is to fabricate the flooring members from composite materials which exhibit improved traction characteristics. Although an improvement to conventional flooring, composite flooring nonetheless suffers from the same tractional deficiencies. Other solutions make use of raised ridging or recessed grooves which also improve traction. While such techniques improve traction, the textured surface tends to trap debris and frustrate efforts to effectively clean the transport floor.

In light of the foregoing, there exists a pressing need to develop a cost-effective means for further improving the tractional characteristics of an enclosure floor without complicating efforts to clean the enclosure.

SUMMARY OF THE INVENTION

The present invention is directed to an enclosure for the containment of livestock. Preferably, the livestock enclosure includes a floor assembly forming a substantially planar floor surface and an overlay assembly operably coupled to the floor assembly for selectable engagement with the floor assembly. Preferably, the overlay assembly includes a traction grid having a plurality of grid apertures extending therethrough, wherein the overlay assembly is configured to be placed adjacent the planar floor surface to provide traction for livestock placed within the enclosure. The overlay assembly is preferably configured to be moved, thereby allowing waste from the livestock to flow through the grid apertures and onto the planar floor surface to facilitate removal of said waste from the planar floor surface to clean the enclosure.

BRIEF DESCRIPTION OF THE DRAWINGS

FIG. 4 is a perspective view of an animal transport with a cutaway view that shows the application of the inventive floor and overlay assemblies.

DESCRIPTION OF THE PREFERRED EMBODIMENT

Figure 1:
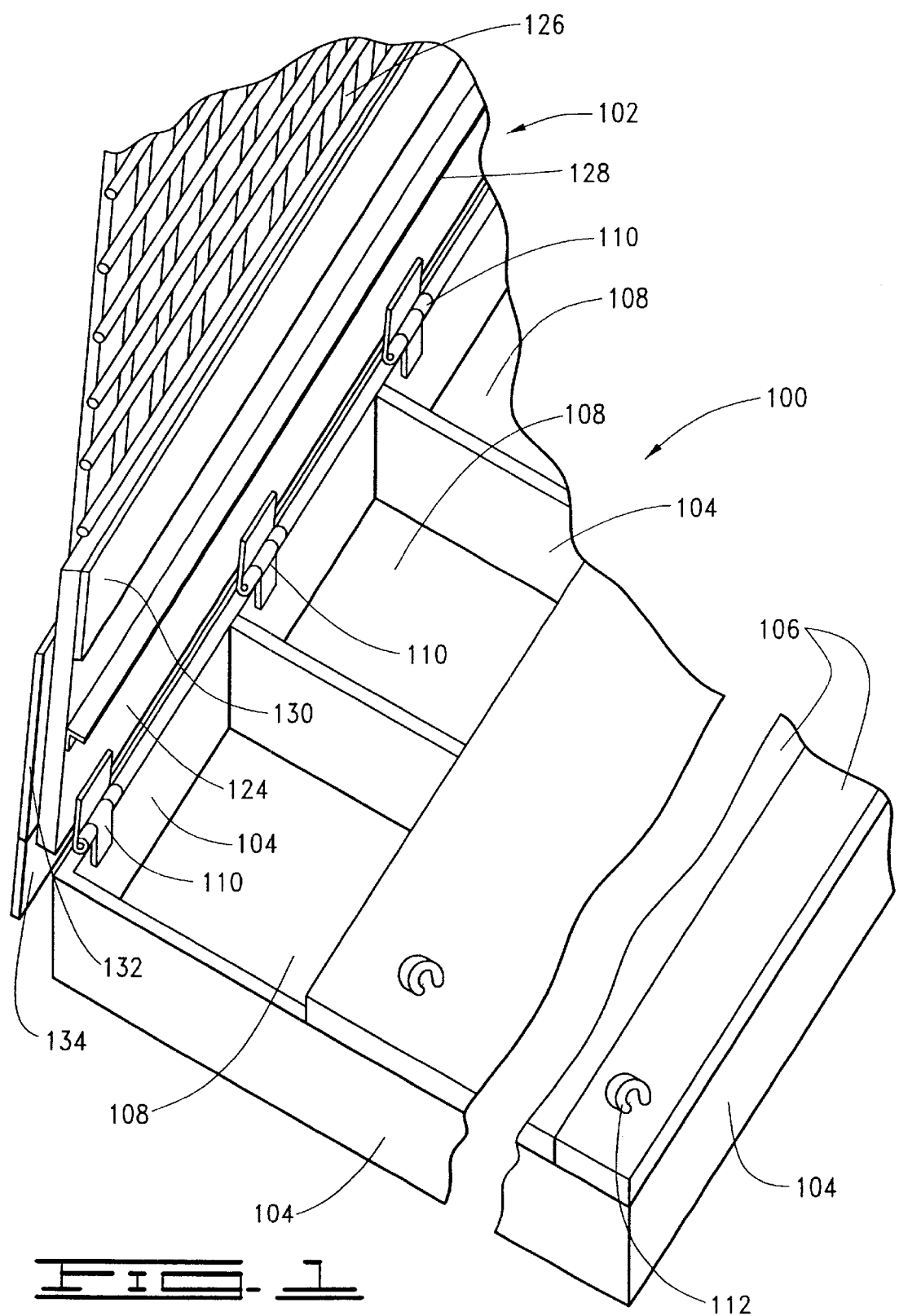
FIG. 1 is a perspective partial view of a preferred embodiment of the floor overlay assembly in a raised position and the drainage chute open.

Turning now to FIG. 1, shown therein is a perspective cross-sectional view of a floor assembly 100 and an overlay assembly 102 constructed in accordance with a preferred embodiment of the present invention. The floor and overlay assemblies 100, 102 are designed to provide an improved flooring apparatus for use in an animal containment area, such as a livestock transport (not shown). The function, form and interrelation of the individual components of each assembly will be discussed in greater detail below.

With continued reference to FIG. 1, the floor assembly 100 includes a plurality of interconnected support members 104 that form a structural framework that extends across the length and width of the floor assembly 100. The support members 104 are individually oriented to provide maximum structural support in response to the vertical force produced by the animal cargo. Preferably, the walls of the containment area (not shown) are also supported by the support members 104.

Although only a portion of the floor assembly 100 is shown in FIG. 1, it will be understood that the floor assembly 100 preferably extends across the length and width of the containment area. It should be noted that the width of the floor assembly 100 may extend parallel or transverse to the longitudinal axis of the containment area.

Persons skilled in the art will recognize that other configurations and materials of construction for the support members 104 are within the scope of the present invention. For instance, Although FIG. 1 depicts a parallel and orthogonal interrelation of the support members 104, alternative configurations are also within the scope of the present invention. Likewise, materials such as wood, channel iron, or other suitable material may be used to construct the support members 104.

Continuing with FIG. 1, the floor assembly 100 includes at least one floor member 106, a drainage chute 108, a plurality of first hinge assemblies 110 and a plurality of J-bolt assemblies 112. In a preferred embodiment, the floor assembly 100 comprises a plurality of rectangular floor members 106 secured to the underlying support members 104. The floor members 106 are placed adjacent one another such that a continuous planar floor surface (not specifically designated) is formed. In a preferred embodiment, the individual floor members 106 are fabricated from a semi-elastic composite material which exhibits desirable tractional qualities.

The floor assembly 100 also includes a drainage chute 108 aperture extending through the floor assembly 100. In a particularly preferred embodiment of the present invention, a space approximately the width of a floor member 106 and extending the length of the floor assembly 100 is reserved as the drainage chute 108. The specific function of the drainage chute 108 will be discussed in greater detail below.

Alternative embodiments of the present invention include making use of a single enlarged floor member 106. In such an embodiment, the single floor member 106 must be manufactured such that a sufficient amount of space is available for the drainage chute 108. Additionally, the floor member(s) 106 may be fabricated from alternate materials. Such materials may include, but are not limited to, wood, aluminum, textured steel, or other suitable material.

Additionally, the present invention is readily capable of being installed into existing transports and enclosures. Such retro-fitted installations of the present invention could be accomplished by modifying the floor of the existing enclosure to receive the overlay assembly 102 and include the drainage chute 108. Retro-fitting existing enclosures and transports may be a cost-effective alternative to purchasing a new trailer.

Continuing with the floor assembly 100 and FIG. 1, included therein are a plurality of primary hinges 110. The primary hinges 110 moveably connect the overlay assembly 102 the floor assembly 100. Because the manufacture of simple hinges is well known in the art of transport design, the specific components of each primary hinge 110 have been omitted from this description. It should be noted, however, that the construction of the primary hinges 110 should enable the support and repetitive operation of the overlay assembly 102.

Although presently preferred embodiments include swinging engagement between the overlay assembly 102 and the floor assembly 100, additional configurations are also encompassed by the scope of the present invention. Such additional configurations include sliding the overlay assembly relative the floor assembly and complete removal of the overlay assembly from the enclosure.

In a preferred embodiment, the primary hinges 110 are disposed about the perimeter of the floor assembly 100 on the top surface of the support members 104. Such placement provides a cost-effective means for attaching the moveable overlay assembly 102 to the floor assembly 100. In an alternative embodiment, the primary hinge assemblies 110 are placed on the inside face of the support members 104 in the vicinity of the drainage chute 108. Such placement allows the primary hinge assemblies 110 to be covered when the overlay assembly 102 is in the lowered position. Covering the primary hinges 110 discourages the entrapment of animal deposits and debris. Persons skilled in the art will recognize that there are a number of possible orientations and configurations of the primary hinges 110, all of which are within the scope of the present invention.

Figure 2:
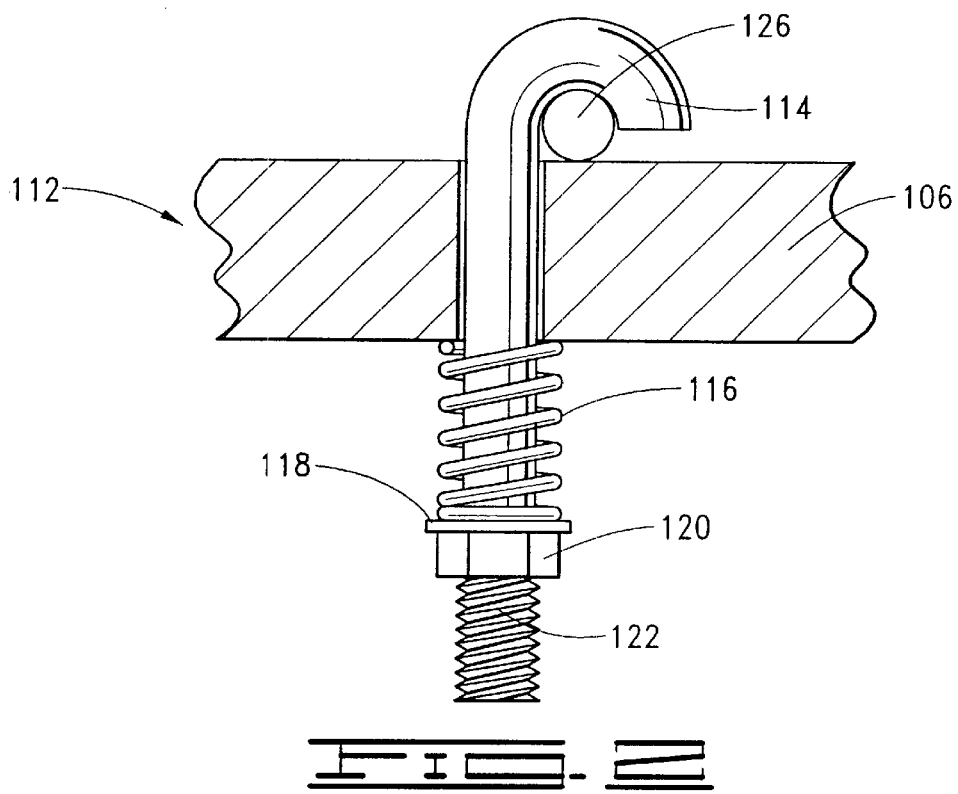
FIG. 2 is a cross-sectional view of a J-bolt assembly of the preferred embodiment of FIG. 1 showing the captured traction grid.

Continuing with the floor assembly 100, contained therein are a plurality of J-bolt assemblies 112. As shown in FIG. 2, the J-bolt assembly 112 comprises a J-bolt 114, a spring 116, a flat washer 118, a lock nut 120 and a threaded portion 122. The J-bolt 114 is substantially "J" shaped, with the straight portion extending vertically through the floor member 106. A spring 116 is placed on that portion of the J-bolt which extends below the floor member 106. The flat washer 118 is placed on the J-bolt and compresses the spring 32 to a desired extent. The flat washer 118 is then held in place by the lock nut 120 which is screwed onto the threaded portion 122. The precise pre-load exerted on the spring 116 may be increased or decreased by varying the vertical position of the lock nut 122 and flat washer 118. The function of the J-bolt assembly 114 will be described below.

Turning back to FIG. 1, the overlay assembly 102 includes a cover plate 124, a traction grid 126 and a reinforcement beam 128. The cover plate 124 is preferably attached to the primary hinges 110 and serves as the support for the balance of the overlay assembly 102. In a preferred embodiment, the cover plate 124 is selected to have an area nominally larger than the exposed area of the drainage chute 108 aperture. In a particularly preferred embodiment of the present invention, the cover plate 124 is cut from a ¼ inch steel plate. Although presently preferred embodiments disclose attaching the cover plate 124 to the primary hinges 110, the cover plate 124 may be disposed at other locations on the overlay assembly 102.

In certain embodiments, the cover plate 124 may require reinforcement to support an increased cargo load. A reinforcement beam 128 may be attached to the underside of the cover plate 124. Preferably, the reinforcement beam comprises a ¼ inch by ½ inch steel beam which, when the floor overlay 102 is closed, unloads upon the support members 104. An alternative embodiment (not shown), includes placing the reinforcement beam 128 over the drainage chute 108 by directly affixing the reinforcement beam 128 to the support members 104. Although affixing the reinforcement beam 128 to the support members 104 simplifies manufacture, such placement may interfere with the efficient removal of animal deposits.

The cover plate 124 also includes a front seal 130, side seals 132 and a rear seal 134. Preferably, the seals are fabricated from a flexible, waterproof member that is secured to the cover plate 124 through conventional means, such as glue or rivets. Additional and alternative materials may be used to construct the seals and include, for example, metal and pre-molded plastic members.

The front seal 130 is preferably adhered to the bottom surface along the distal (free) edge of the cover plate 124. When engaged with the floor assembly 100, the front seal 130 should create a substantially waterproof barrier between the floor members 106 and the distal edge of the lowered cover plate 124. The side seals 132 are preferably adhered to the top surface along the sides of the cover plate 124. The side seals 132 create a substantially waterproof barrier between adjacent cover plates 124 when the overlay assembly 102 is lowered to the floor assembly 100. The rear seal 134 is attached to the top surface along the rear (fixed) edge of the cover plate 124. When the overlay assembly 102 is lowered to the floor assembly 100, the rear seal 134 creates a substantially waterproof barrier between the side walls (not shown) and the rear edge of the cover plate 124.

Continuing with the overlay assembly 102, the traction grid 126 is attached to the top surface of the cover plate 124 by a suitable method, such as welding. The attachment of the traction grid 126 to the cover plate 124 should not interfere with the operation of the cover plate 124 or front seal 30. In a preferred embodiment, the traction grid 126 comprises a first series of grid members (not separately designated) that are equidistantly welded to the cover plate 124. The traction grid 126 further comprises a second series of grid members (not separately designated) which are preferably equidistantly welded to the first series of members. The intersection of the of the first and second series of grid members forms corresponding grid apertures in the spaces therebetween.

In the preferred embodiment, the first and second series of members intersect one another at right angles forming a geometrically consistent rectangular grid. In a particularly preferred embodiment, the traction grid 126 members are fabricated from "rebar" metal that is common to the industry. Alternate materials maybe used to construct the traction grid 126, such as extruded aluminum, plastics, wood, woven wire, composites or other suitable material, and are considered within the scope of the present invention. Additionally, the traction grid 126 may also be constructed from a perforated piece of continuous material, such as sheet metal, that may or may not include raised ridging for traction.

In certain applications, the relative dimensions between the floor overlay 102 and the height of the enclosure may require the use of a bi-fold hinge (not shown) to allow the overlay assembly 126 to be completely raised. In other words, the bi-fold hinge allows the overlay assembly 102 to fold onto itself, thereby reducing the amount of vertical space necessary to raise the floor overlay 102 to the completely raised position. The specific enclosure aspect ratio determines the location of the bi-fold hinge 128 on the floor overlay 102. Because the manufacture of hinges is well known in the art of transport design, the specific components of the bi-fold hinge have been omitted. It should be noted that the swinging operation of the overlay assembly 102 should not be encumbered by surrounding structural elements of the animal enclosure.

Figure 3:
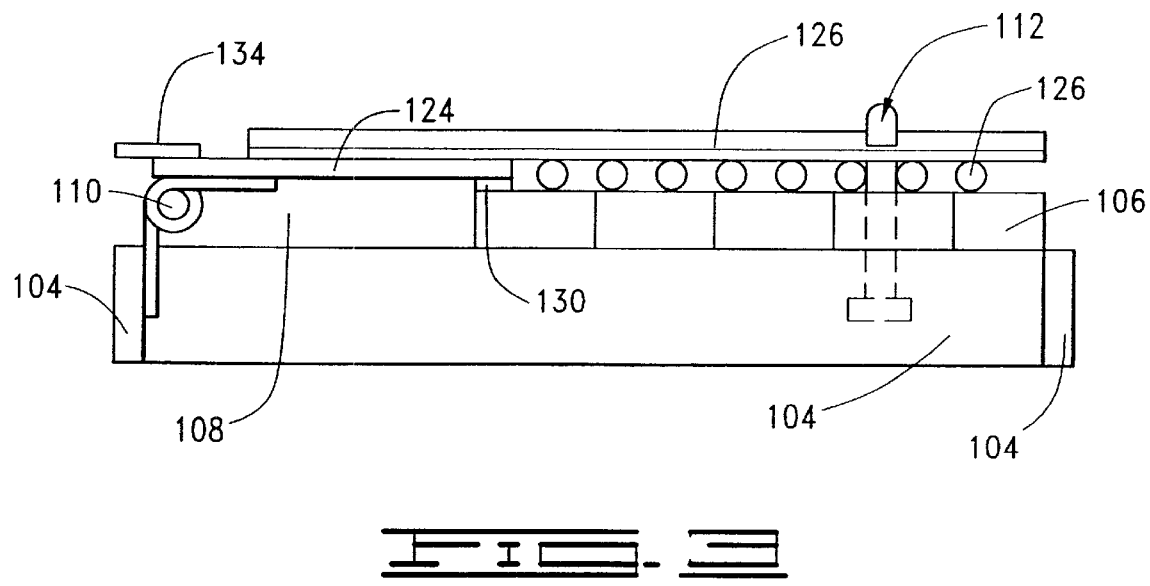
FIG. 3 is an end elevational view of a cross-section of floor assembly of FIG. 1 showing the floor overlay assembly in a lowered position.

Turning now to FIG. 3, shown therein is a side elevational view of the overlay assembly 102 in its lowered position, resting on the floor assembly 100. When the floor overlay 102 is lowered to the floor assembly 100, the cover plate 124 closes the drainage chute 108 and is supported at its free end by the floor member 112. In many applications, it is important that no animal excrement be unintentionally released from the transport during use. Therefore, the cover plate 124 must completely cover the drainage chute 108 when the overlay assembly 102 is in the lowered position. This is accomplished by selecting the width of the cover plate 124 to be slightly larger than the width of the drainage chute 108 and through use of the front seal 130, the side seals 132 and the rear seal 134. Additionally, as mentioned above, the traction grid 126 should not interfere with the effective closing of the drainage chute 108 aperture.

When the overlay assembly 102 is in the lowered position, the traction grid 126 rests on the floor members 106 providing the animal cargo with increased traction. However, while in use, it is necessary to hold the traction grid 126 to the floor assembly 100 to prevent the animals from lifting the overlay assembly 102 from the floor and thereby creating a potential hazard for the animals.

The overlay assembly 100 is held to the floor assembly 100 through use of the J-bolt assemblies 112 in the following manner. First, the J-bolt 114 is raised, thereby loading the spring 116. The J-bolt 114 is then rotated ¼ turn such that the curved portion of the J-bolt 114 is properly aligned with the traction grid 126 member. Next, the J-bolt 114 is released, thereby capturing the traction grid 126 member. In a preferred embodiment of the present invention, the J-bolt assemblies 112 are installed about the periphery of the lowered traction grid 126. Additional J-bolt assemblies 112 maybe used to secure the central portions of the traction grid 126. Persons skilled in the art will recognize that other means for securing the overlay assembly 102 to the floor assembly 100 are also encompassed within the scope of the present invention.

When it becomes necessary to clean the livestock enclosure, the overlay assembly 102 is raised, thereby removing the traction grid 126 from the floor assembly 100. When the traction grid 126 is raised, any waste deposited during use remains on the floor assembly 100. Additionally, raising the overlay assembly 102 also raises the cover plate 124, thereby revealing the drainage chute 108. Opening the drainage chute 108 allows the transport operator to easily remove animal excrement through the floor of the livestock enclosure. Typically, the animal excrement may be removed with water under elevated pressure or with a hand-held implement. Allowing the animal excrement to be removed through the floor of the trailer saves the operator substantial time and effort. When raised, the overlay assembly 102 is preferably secured to a side wall (not shown) through conventional latching means. Such latching means may include, for example, lever operated mechanical latches.

Although the presently preferred embodiment employs the combined use of the floor overlay 102 and the drainage chute 108, it will be readily understood to one skilled in the art that each aspect of the invention may be used individually or in combination. There are, however, unique advantages to using the floor overlay assembly 102 and the drainage chute 108 in combination. For instance, when used in combination, raising the floor overlay 102 facilitates cleaning in two ways. First, removing the traction grid 126 from the floor members 106 reveals a smoother cleaning surface. Second, the simultaneous opening of the drainage chute 108 allows the waste to be efficiently removed from the transport or enclosure.

Referring now to FIG. 4, shown therein in partial cutaway fashion is an animal transport 136 that incorporates the inventive overlay assembly 102 and floor assembly 100. Although the transport 136 is presently depicted as a trailer for ground transport of livestock, it will be understood that the present invention is also suited for use with alternate animal transports, such as rail or marine transports. Additionally, the present invention may also be used in conjunction with the stationary containment of animals, such as in a feed lot enclosure.

As shown in FIG. 4, the enclosure 136 includes a plurality of overlay assemblies 102 in various states of operation. During use, the lowered overlay assembly 102a provides improved traction to the animal cargo. Overlay assembly 102b illustrates the partial retraction of the traction grid from the floor assembly 100, thereby partially revealing the drainage chute 108. Overlay 102c depicts the traction grid 126 completely raised and secured to a side wall 132. Once secured to the sidewall 132, the drainage chute 108 is completely open, thereby permitting unfettered debris removal.

The transport of FIG. 4 employs a plurality of overlay assemblies 102 that are proportioned to cover one-half of the floor assembly 100 of the transport 130. In a preferred embodiment, a second series of overlay assemblies 102 (not shown) are provisioned opposite the overlay assemblies 102 shown in FIG. 4. As such, the entire floor area of the transport 130 can be covered by traction grids 126 while permitting the facilitated removal of animal deposits through opposing drainage chutes 108 that run the length of the transport 130.

In addition to the configuration of overlay assemblies 102 described above, it is also within the scope of the present invention to orient the overlay assemblies (or assembly) 102 parallel to the longitudinal axis of the trailer. In such a configuration, the drainage chute would run perpendicular to the longitudinal axis of the trailer. Such orientation may be desirable in shorter enclosures. Based on particular applications, additional configurations of the overlay assemblies 102 may be selected and are also considered within the scope of the present invention.

As used in the appended claims, the term livestock is meant to include domesticated and undomesticated or exotic animals.

It is clear that the present invention is well adapted to carry out its objectives and attain the ends and advantages mentioned above. While the presently preferred embodiment of the invention has been described in varying detail for purposes of disclosure, it will be understood that numerous changes may be made which will readily suggest themselves to those skilled in the art and which are encompassed within the spirit of the invention disclosed and as defined in the above text and in the accompanying drawings.

It is claimed:

1. An enclosure for the containment of livestock, comprising:
   a floor assembly forming a planar floor surface; and
   an overlay assembly operably coupled to the floor assembly for selectable engagement with the floor assembly, wherein the overlay assembly comprises a traction grid having a plurality of grid apertures extending therethrough, wherein the overlay assembly is configured to be placed adjacent the planar floor surface to provide traction for livestock placed within the enclosure, and wherein the overlay assembly is further configured to be subsequently moved, thereby allowing waste from the livestock to flow through the grid apertures and onto the planar floor surface to facilitate removal of said waste from the planar floor surface to clean the enclosure.

2. The enclosure of claim 1, wherein the overlay assembly is hinged to the floor assembly to provide swinging operation of the overlay assembly relative to the floor assembly.

3. The enclosure of claim 1, wherein the floor assembly has a drainage chute aperture which extends through the planar floor surface to permit removal of the waste by passage through the drainage chute aperture.

4. The enclosure of claim 3, wherein the overlay assembly further comprises a cover plate formed from an impermeable material and having an effective area nominally larger than the drainage chute aperture so that the cover plate and the floor assembly cooperate to substantially retain the waste within the enclosure when the overlay assembly is placed adjacent the floor assembly.

5. The enclosure of claim 4, wherein the traction grid is affixed to the cover plate to provide simultaneous engagement of the cover plate and the traction grid with the floor assembly.

6. The enclosure of claim 4, wherein the overlay assembly includes a plurality of seals disposed about the periphery of the cover plate that cooperate with the floor assembly to substantially retain the waste within the enclosure when the overlay assembly is placed adjacent the floor assembly.

7. The enclosure of claim 1, wherein the traction grid is secured to the floor assembly through use of a plurality of selectably engageable securing members.

8. The enclosure of claim 1, wherein the traction grid comprises a plurality of intersecting grid members which form the plurality of grid apertures.

9. The enclosure of claim 1, wherein the traction grid comprises first and second grid portions intercoupled with a bi-fold hinge to allow folding of the traction grid when the overlay assembly is removed from a position adjacent the planar floor surface.

10. An enclosure for the containment of livestock, comprising:
    a floor assembly having a planar floor surface and a drainage chute aperture which extends through the planar floor surface; and
    an overlay assembly operably coupled to the floor assembly for selectable engagement with the floor assembly, wherein the overlay assembly comprises a traction grid having a plurality of grid apertures extending therethrough and a cover plate sized to substantially cover the drainage chute aperture, wherein the overlay assembly is configured to be placed adjacent the planar floor surface to provide traction for livestock placed within the enclosure, and wherein the overlay assembly is further configured to be subsequently moved, thereby allowing waste from the livestock to flow through the grid apertures and onto the planar floor surface to facilitate removal of said waste from the enclosure by passage through the drainage chute aperture.

11. The enclosure of claim 10, wherein the overlay assembly is hinged to the floor assembly to provide swinging operation of the overlay assembly relative to the floor assembly.

12. The enclosure of claim 10, wherein the traction grid is secured to the floor assembly through use of a plurality of selectably engageable securing members.

13. The enclosure of claim 10, wherein the traction grid comprises a plurality of intersecting grid members which form the plurality of grid apertures.

14. The enclosure of claim 10, wherein the cover plate is formed from an impermeable material and having an effective area nominally larger than the drainage chute aperture so that the cover plate and the floor assembly cooperate to substantially retain the waste within the enclosure when the overlay assembly is placed adjacent the floor assembly.

15. The enclosure of claim 10, wherein the overlay assembly includes a plurality of seals disposed about the periphery of the cover plate that cooperate with the floor assembly to substantially retain the waste within the enclosure when the overlay assembly is placed adjacent the floor assembly.

16. An overlay assembly for use in an enclosure for the containment of livestock, comprising:
    a traction grid having a plurality of grid apertures extending therethrough, wherein the traction grid is configured to be placed adjacent a floor surface to provide traction for livestock supported by the floor surface, and wherein the traction grid is further configured to be subsequently moved, thereby allowing waste from the livestock to flow through the grid apertures and onto the floor surface to facilitate removal of said waste from the floor surface.

17. The overlay assembly of claim 16, wherein the traction grid comprises a plurality of intersecting grid members which form the plurality of grid apertures.

18. The overlay assembly of claim 16, wherein the overlay assembly further comprises a cover plate that is formed from an impermeable material that cooperates with the floor surface to substantially prevent waste from leaving the floor surface.

19. The enclosure of claim 18, wherein the overlay assembly includes a plurality of seals disposed about the periphery of the cover plate that cooperate with the floor surface to substantially prevent waste from leaving the floor surface.

20. The overlay assembly of claim 16, wherein the traction grid comprises first and second grid portions intercoupled with a bi-fold hinge to allow folding of the traction grid when the overlay assembly is removed from a position adjacent the floor surface.

21. An enclosure for the containment of livestock, comprising:

a floor assembly forming a floor surface; and an overlay assembly configured for selectable engagement with the floor assembly, wherein the overlay assembly comprises a traction grid having a plurality of grid apertures extending therethrough, wherein the overlay assembly is configured to be placed adjacent the floor surface to provide traction for livestock placed within the enclosure, and wherein the overlay assembly is further configured to be subsequently moved, thereby allowing waste from the livestock to flow through the grid apertures and onto the floor surface to facilitate removal of said waste from the floor surface to clean the enclosure.

22. An enclosure for the containment of livestock, comprising:

a floor assembly forming a floor surface, wherein the floor assembly has a drainage chute aperture which extends through the floor surface; and an overlay assembly configured for selectable engagement with the floor assembly, wherein the overlay assembly comprises a cover plate formed from an impermeable material and having an effective area nominally larger than the drainage chute aperture.

* * * * *

UNITED STATES PATENT AND TRADEMARK OFFICE
CERTIFICATE OF CORRECTION

PATENT NO.     : 6,450,125 B2
DATED          : September 17, 2002
INVENTOR(S)    : Johnny R. McElroy It is certified that error appears in the above-identified patent and that said Letters Patent is hereby corrected as shown below:

Column 3,
Lines 31-32, replace "assembly 102 the floor assembly 100." with -- assembly 102 to the floor assembly 100. --

Column 5,
Lines 9 and 65, replace "maybe" with -- may be --

Signed and Sealed this

Twenty-fifth Day of February, 2003

JAMES E. ROGAN
*Director of the United States Patent and Trademark Office*